United States Patent Office 2,709,664
Patented May 31, 1955

2,709,664

PROCESS FOR FORMING CHEMICAL RESISTANT SYNTHETIC RESIN COATINGS ON METAL AND PRODUCT THEREOF

Robert M. Evans, Cleveland, Ohio, assignor to The Master Mechanics Co., Cleveland, Ohio, a corporation of Ohio No Drawing. Application October 13, 1950,
Serial No. 190,046

23 Claims. (Cl. 117—75)

This invention relates to a process and the product of a process for forming a tough, adherent, chemically resistant surface coating on metal. More specifically, it relates to the production of such a surface coating on a metal used for the exposed exterior or interior surfaces of an industrial installation such as a fruit-juice extracting machine, a milk-bottling machine, a bottle-washing machine, a beer vat, a centrifuge for processing edible oils, a fume duct, the supporting structure in an acid or other chemical plant, or for any one of a wide variety of other industrial installations, whether or not related to food processing industries, in which metal surfaces must be coated in the interests of sanitation and/or for the purpose of protecting them from corrosion when subjected for prolonged periods of time to alkaline or acid media, sometimes at elevated temperatures. The process and product of the invention are not limited to these uses, but lend themselves to employment in other ways and for other purposes than those mentioned.

For convenience in describing the invention, the disclosure that follows will have particular reference to a bottle-washing machine such as may be used in a fruit-juice extraction plant, where parts of the bottle-washing machine may come into contact with fruit-juice residues containing citric and like organic acids and other parts of the machine may come into contact with detergents, often of an alkaline nature, of any one of the kinds conventionally used to facilitate cleaning of bottles before refilling them. Such a machine operates for prolonged periods of time under conditions of high humidity and elevated temperatures conductive to the deterioration and destruction of the surface coating on the exposed metal parts and to concomitant corrosion of the metal, in part as a result of the presence of electrolytes in the residues and reagents with which the machine comes into contact. Thus from the standpoint of the conditions to which the surface coating is subjected, a machine of this kind presents problems more difficult of satisfactory solution than those presented by most other industrial machines.

In the past, efforts have been made to produce on the exposed metal parts of such machines surface coatings making use of pigmented synthetic resins. When such machines are coated with oleoresinous materials, the coatings become brittle and are readily hydrolized, especially after aging. The use of an alkyd-melamine coating would give a better coating, although still far from satisfactory, but this requires heat conversion, which is impractical on large surfaces. Efforts have also been made to use chlorinated rubber for these purposes, but these have failed from a practical standpoint because of the deficiencies of the chlorinated rubbers as regards adhesion, flexibility and capacity for withstanding elevated temperatures as low as 140° F.

More recently, surface coating systems based on the use of the vinyl polymers have been tried. These also have deficiencies as regards adhesion, flexibility and vulnerability to attack upon exposure to wet temperatures upward of about 165° F. and dry temperatures upward of about 250° F. Also, the relatively high molecular weights and attendant low solubility of the vinyl polymers make impracticable the use of coats of normal thickness. As a result, four to five coats are required for the outside surfaces of industrial equipment and six to seven coats for the inside surfaces of such equipment, particularly if immersion is a factor. Where, as in the usual case, the vinyl polymer is polymerized vinyl chloride or is a co-polymer of vinyl chloride and vinyl acetate, the chlorine tends to form hydrochloric acid under the influence of heat, ultraviolet light, etc., and thus self-catalyze degeneration of the coating.

By contrast with these prior efforts, none of which has been found to be entirely satisfactory under the rigorous conditions likely to be encountered in a bottle-washing machine, the present invention provides a surface coating system that stands up under elevated temperatures and high moisture contents even in the presence of moderately strong chemicals, this without developing any pronounced tendency to blister, flake or peel off. The invention contemplates a system employing at least three but not usually more than four coats, one of them being a surface preparation coat and another being a finishing coat. Between them are one or more base coats characterized by high pigment contents. As a general rule, subject to exceptions hereinafter noted, all of the three or more coats making up the system are so formulated that they dry by solvent evaporation and then cure or convert at room temperatures to provide products having the relatively high molecular weights necessary to the development of the desired resistance and toughness, thus obviating any need for baking and thereby reducing over-all costs. The conjoint use of three or more coats in the manner described yields a surface coating that is highly stable in the presence of acids, alkalies, solvents and other chemicals of the kinds with which bottle-washing machines and similar industrial installations are likely to come into contact.

The invention makes use in two or more of the three or more coats of an amine-convertible film-forming epoxide resin such, for example, as the condensation polymers of bisphenol and other polyhydric phenols with epoxy compounds such as the epihalohydrins. Such film-forming epoxide resins are described in prior patents. Condensation polymers of bisphenol and epichlorhydrin are available on the market in the form of surface coating resins, such products being sold in several grades under the trade-mark "Epon" by Shell Chemical Corporation, New York, New York. Although "Epon" surface coating resins of any one of the several grades currently available may be used (as may also analogous condensation polymers employing polyhydric phenols other than bisphenol and epoxy compounds other than epichlorhydrin), it has been found that "Epon 1004" and "Epon 1007" are particularly well suited for the purposes of the invention.

Condensation polymers of this general class can be reacted at room temperatures with mono- and poly-functional amines to give highly stable carbon-nitrogen-carbon linkages. The latter are found, for example, in structures such as the following derived from the action of a polyamine on a terminal epoxy group:

Not only does the condensation polymer give this highly stable linkage upon conversion, but the conversion reaction can readily be carried out at room temperatures. It can be expedited, if desired, by carrying it out at somewhat elevated temperatures. In either case, it yields an infusible, relatively insoluble film that is resistant to heat, acids and alkalies.

Large proportions of pigments may be incorporated without difficulty in the dispersion from which the film is formed and form part of the film when the condensation polymer cures to yield the final product.

The condensation polymer need not necessarily take the form of a reaction product of epichlorhydrin and bisphenol, for the polyhydric phenol may be mononuclear, as in resorcinol, hydroquinone, catechol, phloroglucinol, etc., or polynuclear, as in bisphenol itself (p,p'-dihydroxydiphenyl dimethyl methane), p,p'-dihydroxybenzophenone, p,p' - dihydroxydiphenol, p,p'-dihydroxydibenzyl, and o,p, o',p'-tetrahydroxydiphenyl dimethyl methane. Polyhydric naphthalenes and related compounds may also be used. The epoxy compound may conveniently be an epihalohydrin, such as epichlorhydrin, epibromhydrin, etc., but may be one of the epihalohydrins of mannitol, sorbitol, erythritol, etc. Other epoxy compounds that may be used for the purpose are bis-2,3-epoxypropyl) ether, butylene dioxide, diepoxides of mannitol, sorbitol, etc. Diethylene triamine is an example of a converting agent of the kind preferred for use therewith.

In lieu of diethylene triamine, it is possible to use as the converting agent any one of various other polyamines such as ethylene diamine, triethylene tetramine, tetraethylene pentamine, etc., the several phenylene diamines, hexamethylene tetramine, homologues and analogues of the foregoing, and sundry other room-temperature converting agents, whether or not of the nature of the aliphatic polyamines, the aromatic polyamines, the common heterocylic polyamines, etc. Apart from the fact that the converting agent preferred for these purposes is a poly-functional amine, it may further be described as being a salt-forming amine in the sense that it is capable of reacting with a weak acid such as acetic acid. It must also be susceptible of reaction with condensation polymers of the type hereinabove described.

Under some circumstances it is possible to make use of the unconverted condensation polymers without adding polyamines or other converting agents, this by virtue of the inherent resistance of a three- or four-coat system of the kind described.

Assuming that it is desired to use a polyamine-converted condensation polymer of bisphenol and epichlorhydrin, the invention contemplates the application to the metal to be coated of a surface-preparation coat which may take any one of several different forms; one or more base coats, each containing, along with the polyamine-converted condensation polymer, a large portion of an inert pigment; and a finishing coat (which, as preferred, may or may not contain a pigment) made up of a polyamine-converted condensation polymer. In each case, the coat last laid down is allowed to harden, usually under atmospheric conditions of temperature and pressure, before the coat to be superimposed upon it is applied to it. As a practical matter, there is little or no fusion of the several coats in the conventional sense; rather, there is a progressive building up of a tough, adherent, chemically-resistant surface coating that functions as a single coat but is made up of three or more coats which in the product retain their own identities to a very large extent.

In a preferred embodiment of the invention, the surface-preparation coat consists of a formulation of the nature of a wash primer comprising a film-forming synthetic resin such as polyvinyl butyral, polyvinyl acetal, polyvinyl formal or the like, phosphoric acid, and an anti-corrosive pigment such as basic zinc chromate, basic lead chromate, zinc dust, zinc oxide, zinc chromate, red lead, blue lead, litharge etc. Where the surface-preparation coat is to take the form of a wash primer, the latter is preferably made up from the following formulation:

| Material: | Parts by weight |
|---|---|
| Polyvinyl butyral XYHL | 93.0 |
| Isopropanol | 650.0 |
| Toluol | 187.0 |
| Basic zinc chromate | 74.3 |
| Asbestine | 11.9 |

These ingredients are mixed in a ball mill. Just before application, equal volumes of the dispersion so obtained and of a 5.4% solution of 85% phosphoric acid ($H_3PO_4$) in isopropanol are mixed to form the wash primer.

Before the composition so made up is applied to the metal surface of the object to be coated, the latter should be thoroughly scrubbed, brushed or sand-blasted and cleaned by means of trichlorethylene, solvent naphtha, detergents or the like. The wash primer is then applied by spraying, brushing or dipping to form a liquid film having a thickness before evaporation of about three thousandths of an inch. It is probable that the phosphoric acid reacts with the metal to form a complex which may or may not include other ingredients such as the anti-corrosive pigment. After the volatile solvent has evaporated, the resulting solid film has a thickness of about 0.0005 inch.

An alternative formulation making use of non-toxic constituents is as follows:

| Material: | Parts by weight |
|---|---|
| Polyvinyl butyral XYHL | 162 |
| Isopropanol | 1135 |
| Toluol | 325 |

The foregoing ingredients yield a solution of polyvinyl butyral that can be used in the following proportions to produce a pigment dispersion:

| | |
|---|---|
| Polyvinyl butyral solution | 668.73 |
| Zinc oxide | 70.04 |
| Aluminum stearate | 6.65 |

These materials are ground together to give a dispersion into which are then mixed 280 parts by weight of zinc dust. Equal parts by volume of isopropanol and the composition so obtained are mixed, after which the mixture is applied as already described.

In the foregoing examples, polyvinyl acetals have been mentioned by way of examples of film-forming synthetic resins that may be used in the wash primer. In lieu thereof may be used epoxide resins and particularly epoxide resins of the nature of film-forming condensation polymers such as the "Epons"; e. g., "Epon 1001," "Epon 1004" and "Epon 1007." In such case, the condensation polymer may if desired (but need not necessarily) be converted by means of a poly-functional amine or some other suitable converting agent. It is not necessary that the condensation polymer be used in the proportions hereinabove mentioned for polyvinyl butyral; instead, it may be used over a range varying from about 20 parts to about 50 parts by weight, being dispersed in the former case in about 80 parts and in the latter case in about 50 parts by weight of methyl ethyl ketone, methyl isobutyl ketone, ethyl ether of ethylene glycol ("Ethyl Cellosolve"), or some other suitable organic solvent. In such case, the phosphoric acid and the anti-corrosive pigment or both may be omitted. The pigment, if used, may vary over a wide range depending upon the pigment itself and the conditions under which it is to be used.

The following is an example of a suitable formulation using the epoxide resin sold under the trade-mark "Epon 1007":

| Material: | Parts by weight |
|---|---|
| Red lead | 400 |
| Asbestine | 175 |
| Methyl Cellosolve (methyl ether of ethylene glycol) | 55 |
| Xylol | 54 |
| Diethylene triamine | 7.1 |
| Epoxide resin solution | 590 |

The epoxide resin solution is made up by dissolving 100 parts by weight of "Epon 1007" in 75 parts by weight of xylol and 75 parts by weight of "Ethyl Cellosolve." The listed ingredients other than the diethylene triamine are ground into sufficient of the resin solution to form a fluid dispersion, the remainder of the resin solution being added subsequently as a thinner. The diethylene triamine should be added separately not more than a few hours before the composition is applied.

It is possible to use in the surface-preparation coat such other film-forming synthetic resins as the air-curing phenolformaldehyde resins, of which "Bakelite BB9700" is an example; the melamine-formaldehyde resins such as "Resimene 881"; the urea-formaldehyde resins; and the dispersion resins.

Regardless of the formulation of the surface-preparation coat, the latter is preferably allowed to harden for a period of from 1 to 24 hours or even longer, after which one or more base coats are applied to it. Assuming the use of a single base coat, the latter may consist of a composition of the following formulation:

| Material: | Parts by weight |
|---|---|
| Titanium dioxide | 300 |
| Waterground mica | 100 |
| Epon 1007 | 262 |
| Methyl Cellosolve | 147 |
| Xylol | 196 |

The ingredients are first ground for 48 hours in a ball mill, after which the dispersion so obtained is thinned with 40 parts by weight of "Methyl Cellosolve" and 36 parts by weight of xylol. Not too long before application of the composition, 7.9 parts by weight of diethylene triamine are added.

If two base coats are to be used, the second may be the same as the first or, if desired, two base coats of different formulations may be employed.

For example, in the first base coat, a formulation such as the following may be used:

| Material: | Parts by weight |
|---|---|
| Zinc chromate | 200 |
| Talc | 150 |
| Methyl Cellosolve | 55 |
| Xylol | 54 |
| Epoxide resin solution | 590 |
| Tetraethylene pentamine | 7.1 |

The epoxide resin solution is preferably made by mixing 100 parts by weight of "Epon 1007" with 75 parts by weight of xylol and 75 parts by weight of "Ethyl Cellosolve." Part of the solution is mixed with the other ingredients, not including the converting agent; the remainder is added as a thinner. As before, the converting agent; that is to say, the tetraethylene pentamine, is advantageously incorporated in the composition shortly before the compositon is used. Preferably, the converting agent is added directly to the composition and the whole is applied in any suitable fashion to form a liquid film of from about 0.002 inch to about 0.005 inch in thickness.

In such case, the second base coat may be formulated as follows:

| Material: | Parts by weight |
|---|---|
| Titanium dioxide | 300 |
| Whiting | 300 |
| Methyl Cellosolve | 40 |
| Solvent naphtha | 36 |
| Epoxide resin solution | 579 |
| Polyethylene Amine 1000 | 7 |

As before, the epoxide resin solution consists of "Epon 1007," "Ethyl Cellosolve" and xylol in weight ratios of 100:75:75, respectively. Part of such solution is admixed with the other ingredients, not including the converting agent, and the remainder is added later as a thinner. The converting agent, which is indicated by its name has a molecular weight of about 1000, is added shortly before the composition is used.

In lieu of zinc chromate, which is given above by way of example of the use in a base coat of an anti-corrosive pigment with little hiding power, it is possible to use red lead, zinc dust, etc. In the other base coat formulations, in lieu of titanium dioxide, which is an example of a prime pigment, it is practicable to use such prime pigments as chrome oxide, iron oxide and various other hiding pigments. Inert pigments that may be used interchangeably with each other where their use is indicated are waterground mica, talc, whiting and numerous other spherical, fibrous and plate-like pigments known to the art. The total pigment content may advantageously be more than about three parts by volume for each ten parts by volume of the unreacted resin; for example, 31% of titanium dioxide along with 15.4% of mica has been found to work very well, as have also talc used to the extent of about 34% along with 34% of titanium dioxide, and whiting in amounts as high as 58% along with 34% of titanium dioxide.

After a minimum waiting period of about 24 hours, during which time the film containing the condensation polymer releases its solvent and, if a converting agent is used, partially cures, the finishing coat may be applied to a wet thickness of from about 0.0015 to about 0.0045 inch over the intermediate coat or coats. The finishing coat may or may not be pigmented, as desired; if pigmented, it may conveniently consist of a composition made up according to the following formulation:

| Material: | Parts by weight |
|---|---|
| Chrome oxide | 200 |
| Epoxide resin solution | 810 |
| Hexamethylene tetramine | 9.72 |

The epoxide resin solution is of the same type as that described in preceding formulations and is mixed in the same manner with the pigment.

As indicated by what has already been said, the finishing coat may be a clear coat; that is to say, a coat in which no pigment of any kind is employed. However, if a pigment is used, the latter may range up to about 35 to 45% by volume of the volume of the unconverted epoxide resin. In a typical case, 15% by volume may be used. The pigment, if employed, will usually (but not necessarily) be chrome oxide, iron oxide, titanium dioxide or some other chemically resistant prime pigment.

As before, the amine need not be used but if used is added shortly before the composition is applied. After the solvent is released, usually after a lapse of from about one to three hours, the film dries to tack-free form. Hardening continues for a period of one to two weeks, giving an infusible, relatively insoluble finishing coat consisting, in the above example, largely of the product obtained by interacting the polyamine and the condensation polymer, together with the pigment.

From what has so far been brought out, it is apparent that the invention involves the application to a base material, usually a metal, of a surface-preparation coat made up of an air-drying film formed from a dispersion of a synthetic resin, preferably (but not necessarily) a dispersion containing an anti-corrosive pigment; one or more intermediate coats made up of the deposited solid residue of a composition consisting of an organic liquid, a pigment or pigments present in large amount, and a film-forming condensation polymer, usually but not necessarily amine-converted, of the nature of one of the "Epon" resins; and a finishing coat, which may or may not be pigmented, likewise made up of the deposited residue of a dispersion in an organic liquid of a film-forming condensation polymer.

This system, when applied and allowed to dry, gives a hard, tough, strongly adherent surface coating which can be scratched with a metal instrument only with difficulty; if scratched, the damage done by the scratch is not likely to extend through the coating to the underlying metal and is much more likely to remove only material near the top of the coating. The coating is flexible in the sense that a piece of light sheet metal to which the coating is applied as described may be bent over a very short radius of curvature without producing cracking, peeling or other undesirable effects in the coating. When exposed to strong chemicals, particularly accompanied by elevated temperatures and humidity, it remains resistant for long periods of time without blistering, checking, chalking or peeling.

Thus the system contemplated by the present invention lends itself unusually well to use in a bottle-washing machine of the kind previously mentioned in which metal surfaces of the machine are exposed to the action of acid residues of fruit juices, to caustic detergents such as sodium hydroxide, and to various other industrial chemicals, including many ordinary organic solvents. The exposure is not as a rule under ordinary atmospheric conditions but under conditions making for exposure to a high degree of humidity or even immersion in water at temperatures ranging up to about and above the boiling point. A system that is resistant under such conditions to acids and alkalies has not heretofore been available for finishing industrial machinery, structures, etc.

It is intended that the patent shall cover, by summarization in the appended claims, whatever features of patentable novelty reside in the invention.

What is claimed is:

1. A process of forming a tough, adherent, chemically-resistant surface coating on metal comprising the steps of applying to the metal a liquid surface-preparation coat consisting essentially of a dispersion of a film-forming vinyl polymer selected from a group consisting of polyvinyl formal, polyvinyl acetal and polyvinyl butyral, said surface preparation coat hardening under atmospheric conditions; applying to the surface-preparation coat so laid down at least one liquid intermediate coat consisting essentially of a heavily pigmented film-forming epoxide resin, said intermediate coat hardening under atmospheric conditions; and, after hardening of the last of the prior coats has taken place, applying thereto a finishing coat consisting essentially of a film-forming epoxide resin, each of said coats retaining its identity to a large extent with little fusion between successive coats.

2. A process of forming a tough, adherent, chemically-resistant surface coating on metal comprising the steps of applying to the metal a liquid surface-preparation coat consisting essentially of a dispersion of a film-forming polyvinyl acetal, said surface-preparation coat hardening under atmospheric conditions; applying to the surface-preparation coat so laid down at least one liquid intermediate coat consisting essentially of a heavily pigmented film-forming epoxide resin, said intermediate coat hardening under atmospheric conditions; and, after hardening of the last of the prior coats has taken place, applying thereto a finishing coat consisting essentially of a film-forming epoxide resin, each of said coats retaining its identity to a large extent with little fusion between successive coats.

3. A process as in claim 1 in which the film-forming vinyl polymer in the surface preparation coat is a polyvinyl formal.

4. A process as in claim 1 in which the film-forming vinyl polymer in the surface-preparation coat is a polyvinyl butyral.

5. A process as in claim 1 in which the film-forming vinyl polymer in the surface-preparation coat is admixed with phosphoric acid and an anti-corrosive pigment.

6. A process of forming a tough, adherent, chemically-resistant surface coating on a metal comprising the steps of applying to the metal a surface-preparation coat consisting essentially of a film-forming polyvinyl acetal dispersed in a volatile liquid; applying thereto, following evaporation of the liquid, an intermediate coat consisting of a pigment, a converting agent, a film-forming condensation polymer of bisphenol and epichlorhydrin, and a volatile liquid; and, following evaporation of the liquid from said intermediate coat, applying a further coat consisting of a converting agent, a film-forming condensation polymer of bisphenol and epichlorhydrin, and a volatile liquid, each of said coats retaining its identity to a large extent with little fusion between successive coats.

7. A process as in claim 6 in which the converting agent and the film-forming condensation polymer are used in the ratio of about 3 parts by weight of the former to 100 parts by weight of the latter.

8. A process as in claim 6 in which the converting agent is an alkylene polyamine.

9. A process as in claim 6 in which the converting agent is diethylenetriamine.

10. A process as in claim 6 in which the converting agent is tetraethylene pentamine.

11. A process as in claim 6 in which the converting agent is a polyethylene amine having a molecular weight of about one thousand.

12. A process as in claim 6 in which the converting agent is hexamethylene tetramine.

13. A process as in claim 6 in which the pigment content of the intermediate coat is of the order of three or more parts by volume of pigment to ten parts by volume of the film-forming condensation polymer.

14. A process of forming a tough, adherent, chemically-resistant surface coating on a metal comprising the steps of applying to the metal a surface-preparation coat consisting essentially of an air-drying film-forming polyvinyl acetal, a pigment, and an organic solvent; applying to the resulting film at least one intermediate coat consisting essentially of a dispersion in an organic solvent of a pigment and a film-forming condensation polymer of a poly-phenol and an epoxy compound; and applying thereto a finishing coat consisting essentially of an organic solvent and a film-forming condensation polymer of a poly-phenol and an epoxy compound, each of said coats retaining its identity to a large extent with little fusion between successive coats.

15. A process as in claim 14 in which the finishing coat is unpigmented.

16. A process as in claim 14 in which the finishing coat is lightly pigmented.

17. A process as in claim 14 in which the finishing coat is pigmented up to 45 parts by volume per 100 parts by volume of the unreacted resin.

18. A coated metal object comprising a metal base; a layer of film-forming synthetic resin in contact with the metal base, said synthetic resin consisting of a polyvinyl acetal; a highly pigmented layer of film-forming synthetic resin overlying said first-mentioned layer, said film-forming synthetic resin consisting of a condensation polymer of a polyhydric phenol and an epoxy compound; and, overlying said second-mentioned layer, another layer of film-forming synthetic resin, said film-forming synthetic resin consisting of a condensation polymer of a polyhydric phenol and an epoxy compound, each of said layers retaining its identity to a large extent with little fusion between successive layers.

19. A coated metal object as in claim 18 in which the condensation polymer is unconverted.

20. A coated metal object as in claim 18 in which the condensation polymer is amine-converted.
21. The product of the process of claim 1.
22. The product of the process of claim 6.
23. The product of the process of claim 14.

References Cited in the file of this patent

UNITED STATES PATENTS

| | | |
|---|---|---|
| 2,198,939 | Hempel | Apr. 30, 1940 |
| 2,453,471 | Switzer et al. | Nov. 9, 1948 |
| 2,500,600 | Bradley | Mar. 14, 1950 |
| 2,500,765 | Montague | Mar. 14, 1950 |
| 2,626,223 | Sattler et al. | Jan. 20, 1953 |

OTHER REFERENCES

"Makes Paint Stick," Science News Letter, July 5, 1947, page 4.